Dec. 8, 1925.    1,564,236

G. H. HARRIS

GATE VALVE MECHANISM

Filed Dec. 10, 1923

Inventor,
Godfrey H. Harris
By Warren D. House,
His Attorney.

Witness:
R. E. Hamilton

Patented Dec. 8, 1925.

1,564,236

UNITED STATES PATENT OFFICE.

GODFREY H. HARRIS, OF KANSAS CITY, MISSOURI.

GATE-VALVE MECHANISM.

Application filed December 10, 1923. Serial No. 679,743.

*To all whom it may concern:*

Be it known that I, GODFREY H. HARRIS, a subject of the British Empire, residing at Kansas City, in the county of Jackson and State of Missouri, have invented a certain new and useful Improvement in Gate-Valve Mechanisms, of which the following is a specification.

My invention relates to improvements in gate-valve mechanisms.

One of the objects of my invention is to provide, in a valve of the kind described, a threaded sleeve, which is arranged to close one or more valves, and which forms a housing for a rotary threaded valve stem, to protect the latter from corrosion, and which also serves as a lubricant container for lubricating the threaded connection between the stem and the sleeve.

A further object of my invention is to provide a valve mechanism, which is simple, cheap, durable, not liable to get out of order, and which is reliable and efficient in operation.

The novel features of my invention are hereinafter fully described and claimed.

In the accompanying drawing, which illustrates the preferred embodiment of my invention—

Similar reference characters designate similar parts in the different views.

Figure 1:
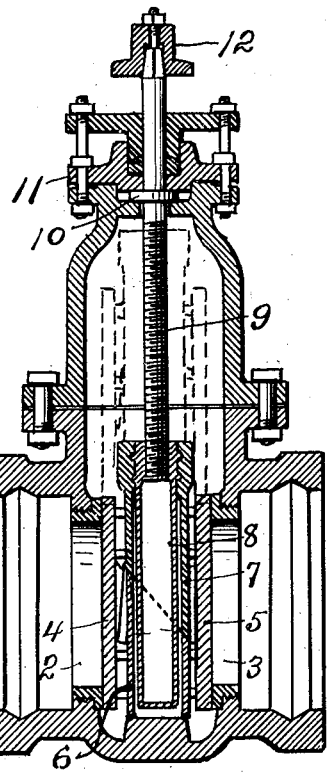
Fig. 1, is a central vertical sectional view of my improved valve mechanism.
Figure 2:
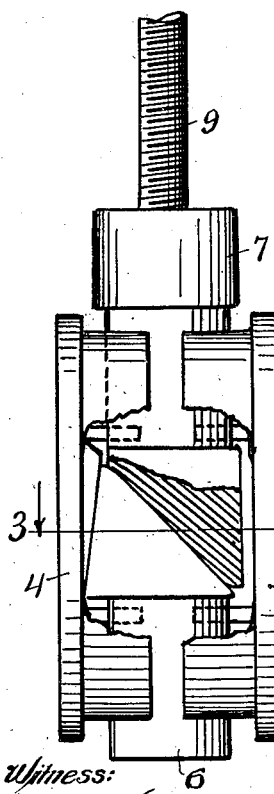
Fig. 2 is an enlarged elevation, partly broken away, of a portion of the same.
Figure 3:
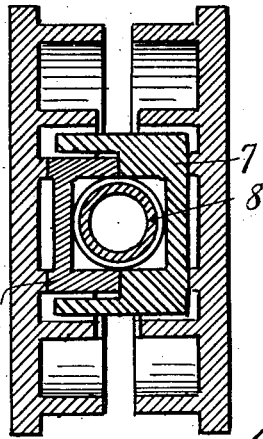
Fig. 3 is a horizontal section on the line 3—3 of Fig. 2.
Figure 4:
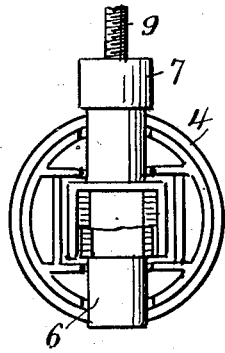
Fig. 4 is an inside elevation of one of the valves and some of the parts connected therewith.

1 designates a valve casing having two ports 2 and 3, arranged to be respectively closed by two valves 4 and 5, which are arranged to be respectively closed by two tubular members 6 and 7.

The member 6 has an oblique upper end against which is adapted to bear the oblique lower end of the member 7. When the latter is forced downwardly, it will engage and force the valve 5 to the closed position, and at the same time will force the member 7 laterally against the valve 4, so as to move the latter to the closed position.

A vertical sleeve 8 is mounted in and rigidly secured to the member 7, so as to move vertically therewith. The sleeve 8 extends into and is adapted to approximately center the member 6.

The upper end of the sleeve 8 is internally screw threaded and has fitted in it the threaded lower portion of a vertical valve stem 9, which extends through and is rotatable in the upper end of the casing 1, and which has a peripheral flange 10, which is held against the top of the casing 1, by a stuffing box 11, of any usual type, which is fastened to the upper end of the casing.

The stem 9 extends through and is rotatable in both directions in the stuffing box 11, and may be provided at its upper end with a handle 12 of any suitable type, by which the stem may be turned in either direction, so as to raise and lower the sleeve 8 and the member 7, so as to open and close the valves 4 and 5.

The lower end of the sleeve 8, may be closed so that the sleeve will form a closed housing for the threaded portion of the stem 9, when the valves are in the usual open position, shown in dotted lines in Fig. 1.

The sleeve 8 may also serve as a lubricant container for holding hard grease, or other lubricating material.

By turning the stem 9 in the proper direction, the sleeve 8, and with it the member 7, may be forced downwardly, thereby forcing the member 6, the lower end of which rests against the casing, laterally so as to close the valve 4. At the same time, the member 7, which has a slight lateral movement, will engage and force the valve 5 to the closed position.

When the stem 9 is turned in the opposite direction, it will lift the sleeve 8 and member 7, and the latter will engage and lift the valves 4 and 5 to the open position, shown in dotted lines in Fig. 1. The member 6 being engaged with the valve 4, will be lifted by the latter.

I do not limit my invention to the structure shown and described, as many modifications, within the scope of the appended claims, may be made without departing from the spirit of my invention.

What I claim is:—

1. In a valve mechanism, a casing having a port, a valve for closing said port, a sleeve having an interiorly threaded open end and a closed opposite end, a member having means for engaging and lifting said valve and provided with an oblique portion at its lower end, a second member having an oblique portion engaging the oblique portion of the other member and movable with said valve and adapted to engage the casing to limit its closing movement and having means for engaging and forcing said valve to the closed position when moved in one direction by the first named member, the latter being secured to and movable with said sleeve, and a stem extending through the wall of the casing and rotatable therein and having a threaded portion fitted in the open end of said sleeve.

2. In a valve mechanism, a casing having a port, a valve for closing said port, two tubular members, one of which has means for engaging and lifting said valve, the other member being movable with said valve and adapted to engage the casing to limit its closing movement and having means for engaging and forcing said valve to the closed position when moved in one direction by the other member, said members each having an oblique portion engaging the oblique portion of the other member, a sleeve closed at one end and having a threaded opposite open end attached to and extending through one of said members and into the other member for centering the latter, and an operating stem extending through the casing and rotatable therein and held thereby from longitudinal movement and fitted in the threaded end of said sleeve.

In testimony whereof I have signed my name to this specification.

GODFREY H. HARRIS.